Figure 3:
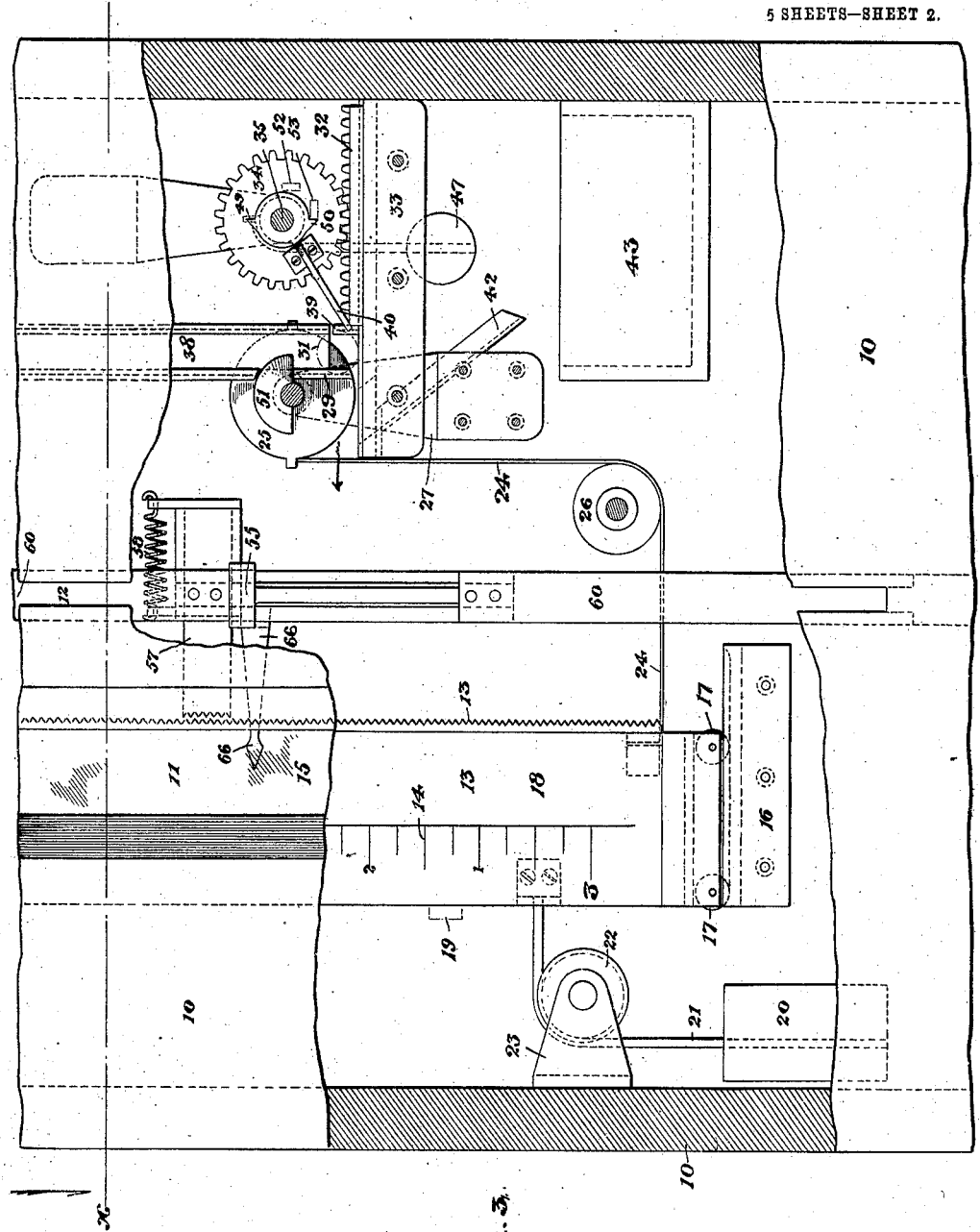

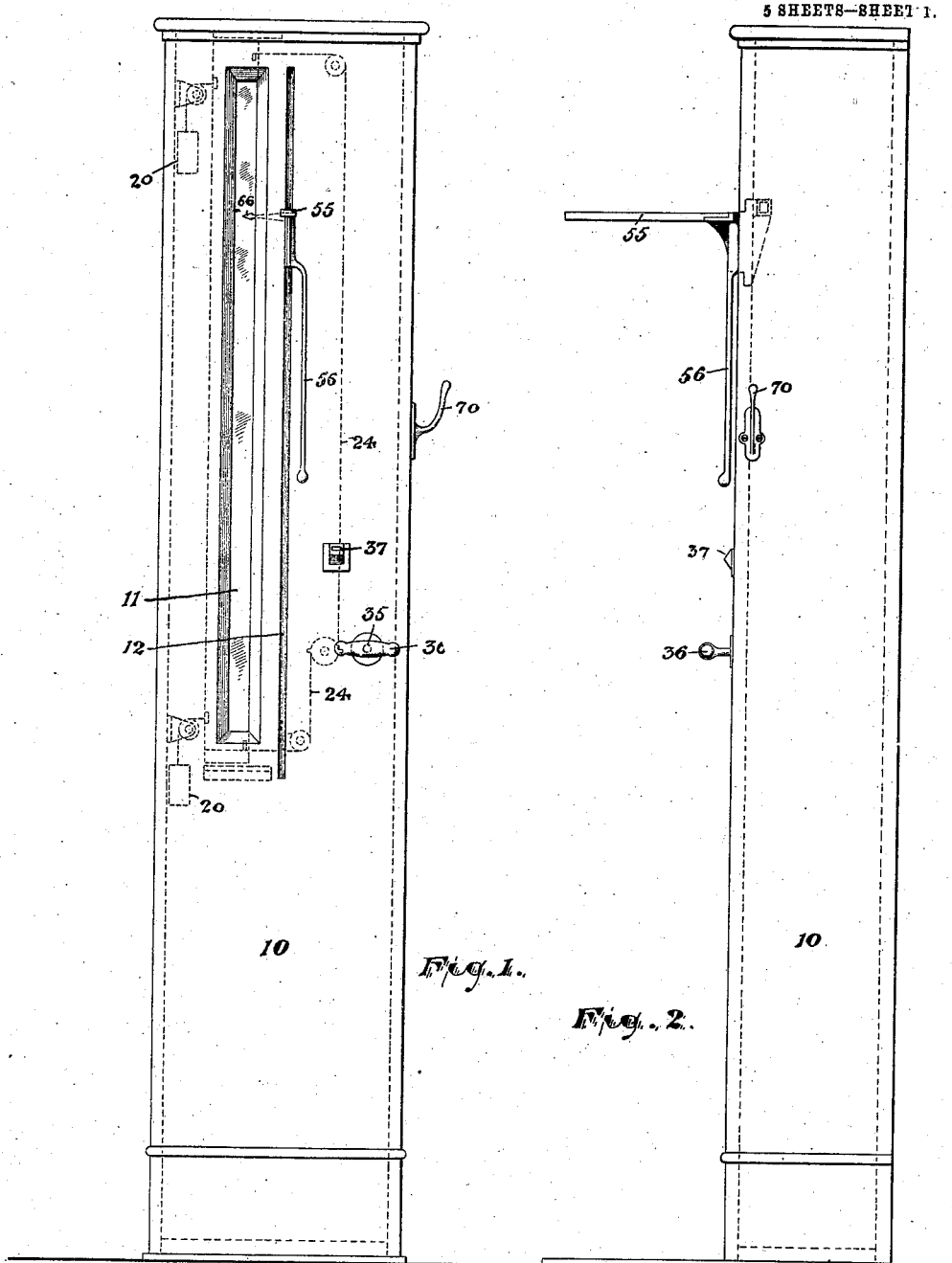

No. 850,955. PATENTED APR. 23, 1907.
J. McNISH & L. W. GRAY.
HEIGHT MEASURING MACHINE.
APPLICATION FILED JAN. 11, 1906.

5 SHEETS—SHEET 2.

WITNESSES: INVENTORS
Ralph Lancaster James McNish,
M. V. Doyle. Leonard W. Gray,
BY
Charles H. Pell
ATTORNEY.

THE NORRIS PETERS CO., WASHINGTON, D. C.

No. 850,955. PATENTED APR. 23, 1907.
J. McNISH & L. W. GRAY.
HEIGHT MEASURING MACHINE.
APPLICATION FILED JAN. 11, 1906.
5 SHEETS—SHEET 3.
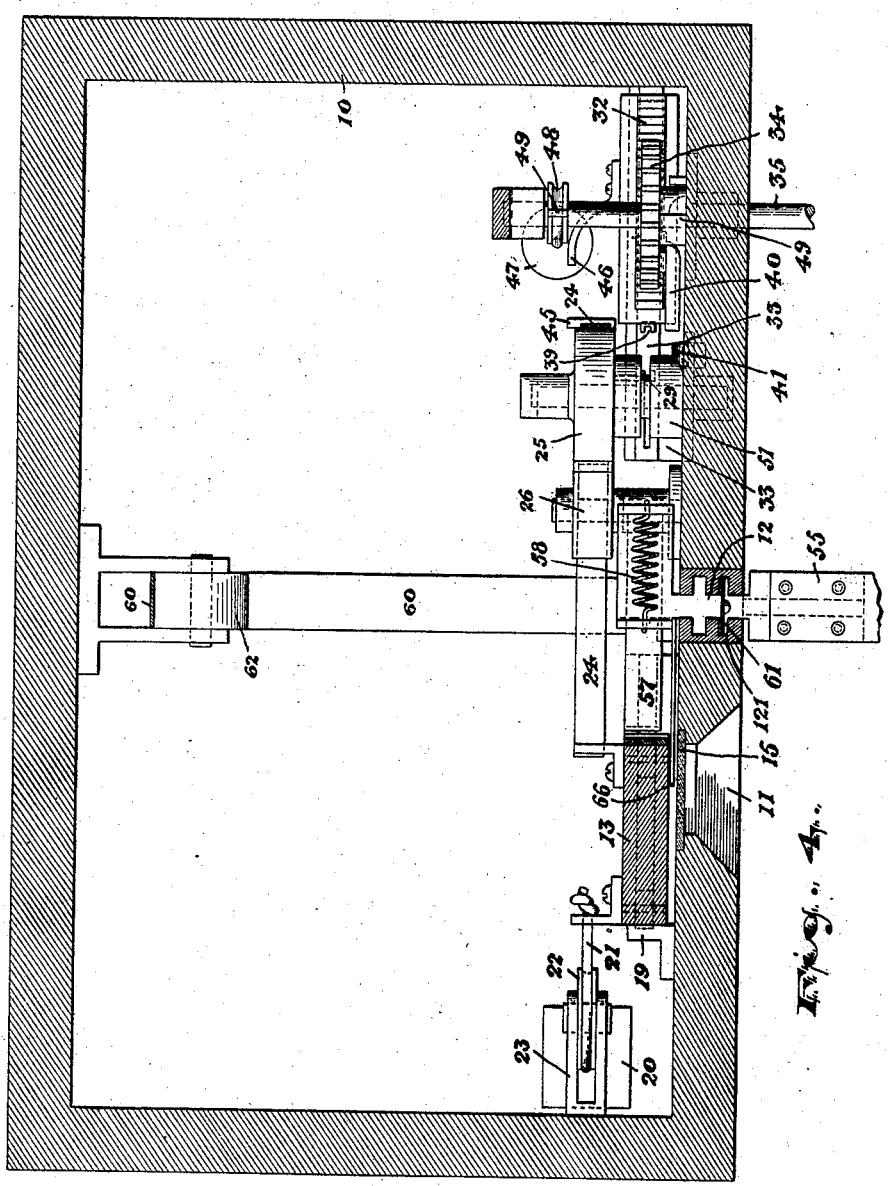
WITNESSES:
Ralph Lancaster
M. V. Doyle.
INVENTORS
James McNish,
Leonard W. Gray,
BY
Charles H. Pell
ATTORNEY

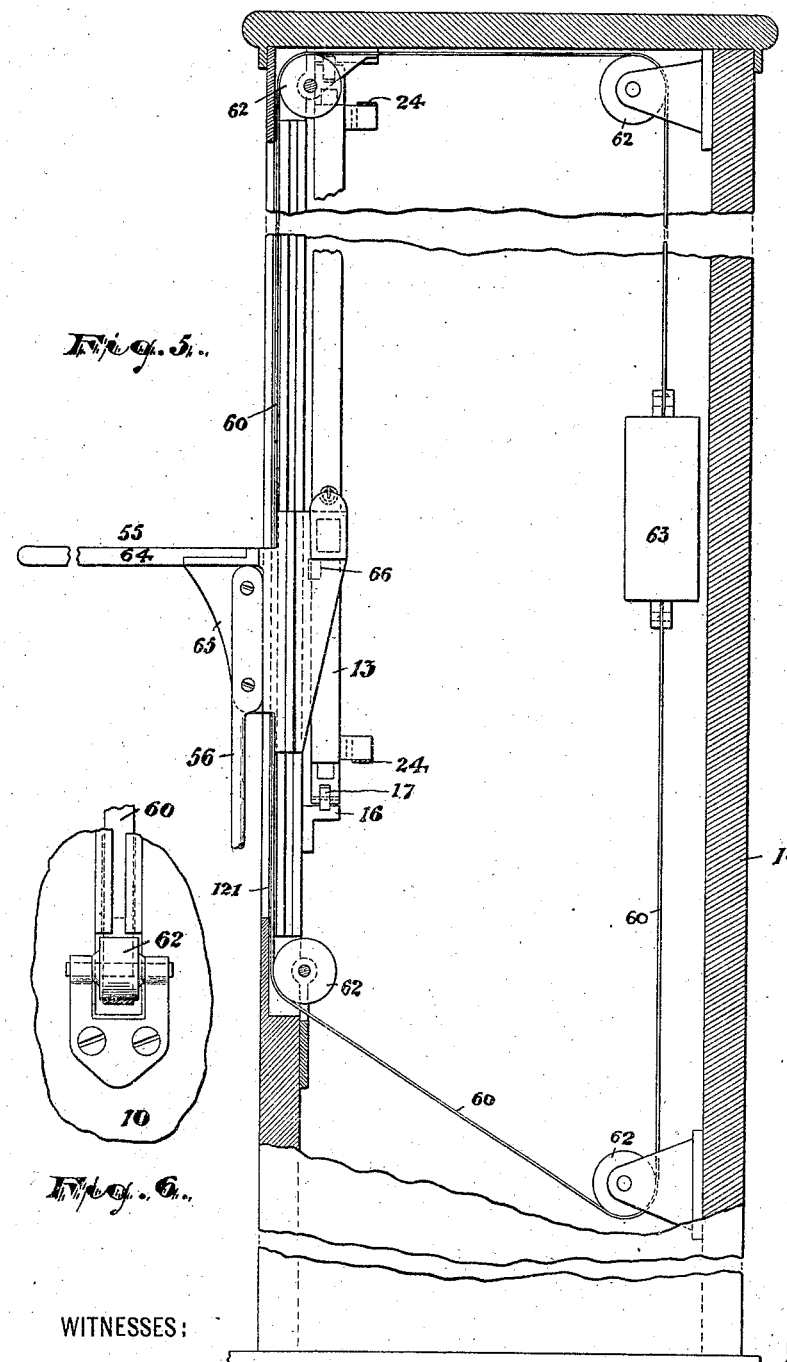

No. 850,955. PATENTED APR. 23, 1907.
J. McNISH & L. W. GRAY.
HEIGHT MEASURING MACHINE.
APPLICATION FILED JAN. 11, 1906.
5 SHEETS—SHEET 5.
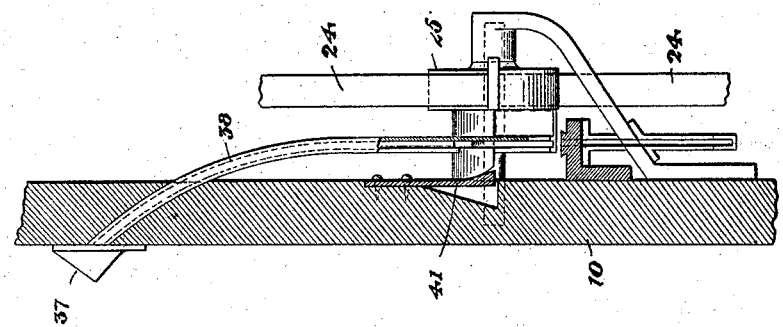
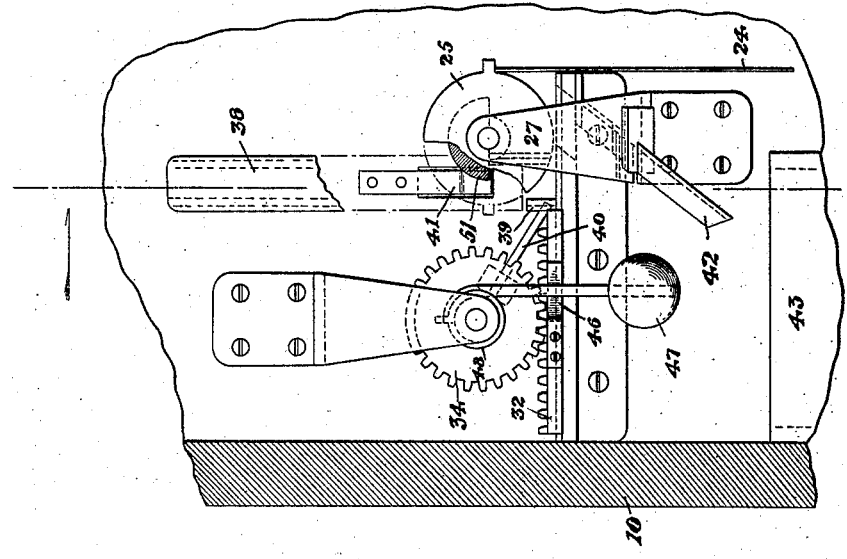
WITNESSES:  INVENTORS
Ralph Lancaster  James McNish,
M. V. Doyle.  Leonard W. Gray,
BY
Charles H. Pell.
ATTORNEY.

UNITED STATES PATENT OFFICE.

JAMES McNISH AND LEONARD W. GRAY, OF NEWARK, NEW JERSEY, ASSIGNORS OF FOUR-TENTHS TO SAID McNISH AND SIX-TENTHS TO GEORGE PRITCHARD, OF NEWARK, NEW JERSEY.

HEIGHT-MEASURING MACHINE.

No. 850,955.  Specification of Letters Patent.  Patented April 23, 1907.

Application filed January 11, 1906. Serial No. 295,560.

*To all whom it may concern:*

Be it known that we, JAMES McNISH and LEONARD W. GRAY, citizens of the United States, residing at Newark, in the county of Essex and State of New Jersey, have invented certain new and useful Improvements in Height-Measuring Machines; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to facilitate the measuring of the height of an individual, to enable the measuring operations to be more conveniently performed, to prevent the measuring device from being employed except when paid for, and to obtain other advantages and results, some of which may be hereinafter referred to in connection with the description of the working parts.

The invention consists in the improved coin-controlled height-measuring device and in the arrangements and combinations of parts of the same, all substantially as will be hereinafter set forth, and finally embraced in the clauses of the claim.

Referring to the accompanying drawings, in which like letters of reference indicate corresponding parts in each of the several figures, Figure 1 is a front elevation of our improved machine. Fig. 2 is a side view of the same. Fig. 3 is a front view of a portion of the device, on an enlarged scale, partly broken away to show certain of the interior working parts more clearly. Fig. 4 is a horizontal section of the same, taken at line *x*. Fig. 5 is a side elevation of a portion of the device, also broken away to show the interior construction. Fig. 6 is a detail of a certain sheave and its connections, and Figs. 7 and 8 are views showing more in detail the means for guiding the coin into coin-controlling relation to the measuring-scale plate to bring the latter into view.

In said drawings, 10 indicates a box or case which is in practice seven feet, more or less, in height, or of a height sufficient to enable an ordinary individual to enter beneath the measuring-arm 55, projecting horizontally out from its front, so that said arm carried by said box can be forced down into engagement with the top of his head. At the front of said box are two parallel slots 11 and 12, the slot 11 being somewhat wider than the slot 12 and being adapted to expose a scale-plate. The walls of the slot 11 are preferably beveled, as clearly shown in Fig. 4, to give a wider opening at the front of said slot, and thus more freely permit the light to enter and impinge on the scale-plate 13, and thus make the scale-marks 14 more clearly visible to the eye.

The slot 11 may contain a glass 15 to protect the scale-plate 13 and an index-finger, hereinafter referred to, from improper manipulation or damage. The said scale-plate 13 is arranged vertically and parallel with the slot 11 in suitable bearings within the case 10 and is adapted to travel back and forth upon or in suitable guideways 16, which may be in the form of brackets, as indicated in Figs. 3 and 5. The said scale-plate 13 may either slide on said guideways 16 or, preferably, the said scale-plate is provided with rollers or wheels 17, by which friction is reduced and largely avoided. The said scale-plate 13 extends vertically from a point about three feet above the level of the ground or floor to a point closely near the top of the case and is provided at one side of the vertical series of scale-marks 14 with a blank space 18 of about the width of the slot 11 at its narrowest part, and the movements of the said traveling scale-plate is limited in one direction by suitable means, such as a stop or detent 19, and in the opposite direction by means hereinafter more particularly referred to. When the machine is out of service, the blank portion 18 of the scale-plate stands in view, and when the said scale-plate is brought into service by the introduction of a coin to the machine, as hereinafter described, the scale-marks 14 are brought into view at said slot 11. While I have spoken of the portion 18 of the scale-plate as being "blank," still it may serve some useful purpose, such as an advertising-surface upon which to print instructions for operating the machine, business-cards, &c. The upper end of the scale-plate may be held suitably in a guideway and be provided with rollers similar to those at the bottom of said plate. The scale-plate 13 is held normally with its scale-marks concealed by a weight 20, connected with the said scale-plate by a cord 21, arranged over an idle pulley or sheave 22, the latter being pivoted on a bracket 23 at one side of the box 10.

Upon the introduction of the coin as above referred to the latter falls to a position in which it becomes a member of a train of means whereby the said scale-plate is moved transversely of the slot 11 to expose the marks 14. The means preferred are shown more clearly in Figs. 3, 7, and 8, where 24 is a tape or flexible connection attached at one end to the lower end of said plate 13 and at its opposite end upon a pulley 25, the said tape or connection being arranged over an idle pulley 26. The said pulley 25 is pivoted upon a bracket or other bearing 27 and is provided with a coin-receiving rib 29, Fig. 3, adapted to be brought into alinement with one side of a coin-passage 38, the said coin-passage 38 and rib 39 being correspondingly grooved to receive the peripheral edge of the coin. The coin being inserted in the machine at the mouth 37 is led to the position indicated in Fig. 3 in dotted outlines at 31, where it stands on the guideway 33 until hand-operable means are brought into service to force said coin and the pulley-wheel 25, in connection therewith, in the direction indicated by the arrow, thereby turning the wheel 25 on its axis and winding the tape 24, so that the latter draws the scale-plate 13 to a position to expose the scale-marks 14. The means preferred for thus operating the wheel 25 comprise a sliding rack 32, arranged on a slideway 33 and engaged by a pinion 34 on a shaft 35, extending out through the front part of the box 10 and provided with an outside handle 36. Thus upon inserting the coin through the mouth 37 of the coin-guideway 38 said coin is led to a point between the rib 29 and the lip 39 of the rack 32, and said coin thus closes a continuous mechanical connection of the wheel 25 and the rack 32, so that the movement of the said rack on its slideway is immediately imparted to the wheel to produce the desired rotary or oscillating movement by which the tape 24 is wound. The pinion 34 is preferably provided with a finger or arm 40, adapted to engage a stopper 41, (shown in Figs. 4, 7, and 8,) which normally lies in the path of said arm 40, so that any improper manipulation of the machine would be prevented by engagement of said arm 40 with the stopper; but upon the introduction of the coin and turning the said handle the said stopper is held by a cam 51 out of the path of movement of said arm, so that the latter is permitted to turn with the pinion 34 to effect the release above described.

Upon the turning of the pinion 34 by means of handle 36 and the horizontal movement of the rack 32 against the coin 31 the latter is forced with the wheel 25 a distance equal or approximately equal to the width of the space 18 of the scale-plate, after which it disengages from the pulley 25 and drops by gravity into a chute 42 and thence into a receptacle 43 for the coin, thus releasing the pulley 25, so that the scale-plate is free to return to its normal position under the power of the weight 20, excepting as it is held by a pin or projection 45, Fig. 4, on the pulley 25, and the arm 46, fastened to the rack 32, which parts serve to prevent return movement while the handle of the pinion is held by the hand of the operator. Upon the release of the handle 36 the weight 20, assisted by the weight 47, attached to the pulley 48 on the shaft 36, effects a return movement of the scale-plate, so that the scale-marks are again concealed. The movement of the handle is limited by the stop projections 49 50, which engage coöperating stops 52 53, secured to or formed on the inside wall of the front part of the box or case. To throw the spring-stops 41 out of service, we employ a cam 51, which is formed upon or forms a part of the pulley 25 and operates therewith.

The measurements are obtained by means of a projecting head-rest or measuring-arm 55, which works in the slot 12, being operable by a handle 56, attached thereto in any suitable manner, the handle serving to enable a short person to pull the measuring-arm down from the upper part of the case. Said measuring-arm has its bearings in the front part of the box 10 and extends through said slot into the interior of said box, where it is provided with a sliding extension 57, having teeth adapted to engage a toothed edge of the plate 13, the said toothed extension being brought near to said toothed edge of the plate by a spring 58, so that when the handle is turned a direct engagement of the tooth will be obtained. Normally the teeth of the plate 13 and plate 57 lie a little apart, so as to provide a free sliding of the measuring-arm in its slot.

To prevent any manipulation of the interior devices through the slot 12, we have attached to the extension a tape 60, which lies in an interior enlargement 121 of the slot 12, as indicated more clearly in Fig. 4. The said tape 60 travels with the arm, as indicated more clearly in Fig. 5, the said tape being arranged over pulleys 62 near the top and bottom of the slot 12, the said tape being provided with a counterbalancing-weight 63 within said box adapted to balance the measuring-arm 55 and its connections, so that said arm will stand at any desired location by friction. The measuring-arm 55 is preferably in sections, the outwardly-extending part 64 being separable from the body 65, for service in shipping and to enable in the event of breakage the part 64 to be renewed without dismembering the other parts of the machine. The operating-handle for the measuring-arm 55 is also preferably separable from the body 65 for the same purpose. In connection with the body 65 of the measuring-arm we have provided an index-finger 66 which is movable with said arm 55, and projects into the slot 11, where it is adapted to be seen in connection with the marks 14 of the plate 13, so that when the measuring-arm has been lowered by the operator into engagement with the top of his head the index-finger in connection with the marks 14 then in view in the slot will clearly indicate to said operator his height in feet, inches, and fractions of inches.

In operating the device the person to be measured stands in front of the box 10 beneath the projecting measuring-arm 55, the operator preferably facing the slot 11, so as to enable him to see the measure indicated therein. He then draws the measuring-arm into contact with his head. Afterward he places a coin in the slot, which is led into engagement with the pulley 25. The operator then turns the handle 36, and this turns the pinion 34 and forces the sliding rack 32 against said coin and the coin against the rib 29, causing the said wheel 25 to wind up the strap 24 and draw the scale-plate on its guideway or bracket 16, thus bringing the measure-indicating marks 14 into view and into close proximity to the index-finger 66, so that the said operator holding the handle clearly sees the visual expression of his measurement, after which he releases the handle and the parts assume their normal position.

A hat-rack 70 may be attached to the box to hold the operator's hat during the measuring operations.

Having thus described the invention, what we claim as new is—

1. In a height-measuring machine the combination with the box having a measuring-arm projecting horizontally therefrom and having an index-finger in connection therewith, scale-plate straps connecting the top and bottom ends of the scale-plate with a pulley, said pulley and means for turning said pulley and drawing the said ends of the scale-plate simultaneously, substantially as set forth.

2. An improved height-measuring machine, comprising a box having a pair of slots in one face, an arm working in one slot and projecting therefrom, an index-finger on the arm, inside the box and projecting into view in the second slot, a scale-plate secured at its top and bottom in sliding relation to the inside of the face of the box, and arranged to be slid to and from view in the second slot, and means for manually operating the scale-plate.

In testimony that we claim the foregoing we have hereunto set our hands this 3d day of January, 1906.

JAMES McNISH.
LEONARD W. GRAY.

Witnesses:
CHARLES H. PELL,
M. V. DOYLE.